United States Patent
Palangie et al.

(10) Patent No.: US 12,148,111 B2
(45) Date of Patent: *Nov. 19, 2024

(54) TANGIBILITY VISUALIZATION OF VIRTUAL OBJECTS WITHIN A COMPUTER-GENERATED REALITY ENVIRONMENT

(71) Applicant: Apple Inc., Cupertino, CA (US)

(72) Inventors: Alexis Palangie, San Francisco, CA (US); Avi Bar-Zeev, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,878

(22) Filed: Sep. 11, 2023

(65) Prior Publication Data
US 2023/0419622 A1 Dec. 28, 2023

Related U.S. Application Data

(63) Continuation of application No. 17/527,976, filed on Nov. 16, 2021, now Pat. No. 11,756,269, which is a continuation of application No. 16/375,595, filed on Apr. 4, 2019, now Pat. No. 11,182,964.

(60) Provisional application No. 62/664,759, filed on Apr. 30, 2018.

(51) Int. Cl.
*G06T 19/00* (2011.01)
*G06T 7/73* (2017.01)
*G06T 15/20* (2011.01)
*G06T 19/20* (2011.01)

(52) U.S. Cl.
CPC .............. *G06T 19/006* (2013.01); *G06T 7/74* (2017.01); *G06T 15/205* (2013.01); *G06T 19/003* (2013.01); *G06T 19/20* (2013.01); *G06T 2215/16* (2013.01)

(58) Field of Classification Search
None
See application file for complete search history.

(56) References Cited

U.S. PATENT DOCUMENTS

| | | | | |
|---|---|---|---|---|
| 2012/0113140 | A1* | 5/2012 | Hilliges | A63F 13/213 345/633 |
| 2013/0072297 | A1* | 3/2013 | Seegers | A63F 13/213 463/31 |
| 2013/0286004 | A1* | 10/2013 | McCulloch | G06T 19/006 345/419 |

* cited by examiner

*Primary Examiner* — James A Thompson
*Assistant Examiner* — Kim Thanh T Tran
(74) *Attorney, Agent, or Firm* — DLA Piper LLP (US)

(57) ABSTRACT

The present disclosure relates to techniques for providing tangibility visualization of virtual objects within a computer-generated reality (CGR) environment, such as a CGR environment based on virtual reality and/or a CGR environment based on mixed reality. A visual feedback indicating tangibility is provided for a virtual object within a CGR environment that does not correspond to a real, tangible object in the real environment. A visual feedback indicating tangibility is not provided for a virtual representation of a real object within a CGR environment that corresponds to a real, tangible object in the real environment.

25 Claims, 8 Drawing Sheets

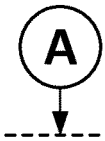

416
In accordance with detecting, using the one or more sensors, a second movement of the first real object from the second location to a third location in the environment:

418
Present a corresponding movement of the representation of the first real object from the second location to the third location in the CGR environment.

420
In accordance with a determination that the distance criteria is satisfied and the virtual object does not correspond to the second real object, remove a second portion of the displayed virtual object, the second portion different from the portion of the displayed virtual object that is removed.

422
In accordance with a determination that a second distance criteria is satisfied and the virtual object does not correspond to the second real object, remove an additional portion of the displayed virtual object from the displayed virtual object with the portion removed, where the second distance criteria is satisfied when the third location is within a second threshold distance of the virtual object, the second threshold distance smaller than the threshold distance.

424
In accordance with a determination that the distance criteria is no longer satisfied, re-present the removed portion of the displayed virtual object.

FIG. 4B

TANGIBILITY VISUALIZATION OF VIRTUAL OBJECTS WITHIN A COMPUTER-GENERATED REALITY ENVIRONMENT

CROSS-REFERENCE TO RELATED APPLICATIONS

This application is a continuation of U.S. patent application Ser. No. 17/527,976, entitled "TANGIBILITY VISUALIZATION OF VIRTUAL OBJECTS WITHIN A COMPUTER-GENERATED REALITY ENVIRONMENT," filed Nov. 16, 2021, which is a continuation of U.S. patent application Ser. No. 16/375,595, now U.S. Pat. No. 11,182,964, entitled "TANGIBILITY VISUALIZATION OF VIRTUAL OBJECTS WITHIN A COMPUTER-GENERATED REALITY ENVIRONMENT", filed Apr. 4, 2019, which claims priority to U.S. Provisional Patent Application Ser. No. 62/664,759, entitled "TANGIBILITY VISUALIZATION OF VIRTUAL OBJECTS WITHIN A VIRTUAL ENVIRONMENT," filed Apr. 30, 2018, the contents of which are hereby incorporated by reference in their entirety.

FIELD

This application relates generally to a computer-generated reality environment, and more specifically to techniques for providing tangibility visualization of virtual objects within a computer-generated reality environment.

BACKGROUND

Computers can completely project or partially superimpose computer-generated images on a user's view to provide a computer-generated reality environment that can be experienced by the user. A computer-generated reality environment can be based on different types of realities. An electronic device optionally detects the user's real movements and projects and simulates those movements within a series of visual images or video of the computer-generated reality environment. Through these movements projected or simulated within the computer-generated reality environment, the user can interact with objects within the computer-generated reality environment.

BRIEF SUMMARY

The present disclosure describes techniques for providing tangibility visualization of virtual objects within a computer-generated reality (CGR) environment, where the CGR environment provides a user interacting with the CGR environment with a realistic and immersive experience. Because the experience is realistic and immersive, the user can easily confuse a virtual (and thus intangible) object within the CGR environment as being a real tangible object that exists outside of the CGR environment.

Thus, the described techniques enhance user convenience and further provide the user with an enhanced degree of safety when interacting with a CGR environment by enabling the user to quickly and easily visually recognize whether an object within the CGR environment is a non-tangible virtual object or corresponds to a real, and thus tangible, object in the real environment.

Additionally, the described techniques are not limited to providing tangible visualization to a particular type of CGR environment, but rather can be implemented in any type of CGR environment. These environments include, for example, CGR environments based on mixed reality and CGR environments based on virtual reality.

In accordance with some embodiments, a method is described. The method comprises: presenting a computer-generated reality environment comprising a representation of a first real object and a displayed virtual object; in accordance with detecting, using one or more sensors, a movement of the first real object, presenting a corresponding movement of the representation of the first real object from a first location to a second location in the computer-generated reality environment; and in accordance with a determination that a distance criteria is satisfied and the virtual object does not correspond to a second real object detected using the one or more sensors, removing a portion of the displayed virtual object, wherein the distance criteria comprises a threshold distance between the second location and the virtual object.

In accordance with some embodiments, a non-transitory computer-readable storage medium is described. The non-transitory computer-readable storage medium storing one or more programs configured to be executed by one or more processors of an electronic device, the one or more programs including instructions for: presenting a computer-generated reality environment comprising a representation of a first real object and a displayed virtual object; in accordance with detecting, using one or more sensors, a movement of the first real object, presenting a corresponding movement of the representation of the first real object from a first location to a second location in the computer-generated reality environment; and in accordance with a determination that a distance criteria is satisfied and the virtual object does not correspond to a second real object detected using the one or more sensors, removing a portion of the displayed virtual object, wherein the distance criteria comprises a threshold distance between the second location and the virtual object.

In accordance with some embodiments, a transitory computer-readable storage medium is described. The transitory computer-readable storage medium storing one or more programs configured to be executed by one or more processors of an electronic device, the one or more programs including instructions for: presenting a computer-generated reality environment comprising a representation of a first real object and a displayed virtual object; in accordance with detecting, using one or more sensors, a movement of the first real object, presenting a corresponding movement of the representation of the first real object from a first location to a second location in the computer-generated reality environment; and in accordance with a determination that a distance criteria is satisfied and the virtual object does not correspond to a second real object detected using the one or more sensors, removing a portion of the displayed virtual object, wherein the distance criteria comprises a threshold distance between the second location and the virtual object.

In accordance with some embodiments, an electronic device is described. The electronic device comprises one or more processors and memory storing one or more programs configured to be executed by the one or more processors, the one or more programs including instructions for: presenting a computer-generated reality environment comprising a representation of a first real object and a displayed virtual object; in accordance with detecting, using one or more sensors, a movement of the first real object, presenting a corresponding movement of the representation of the first real object from a first location to a second location in the computer-generated reality environment; and in accordance with a determination that a distance criteria is satisfied and the virtual object does not correspond to a second real object detected using the one or more sensors, removing a portion of the displayed virtual object, wherein the distance criteria comprises a threshold distance between the second location and the virtual object.

In accordance with some embodiments, an electronic device is described. The electronic device comprises: means for presenting a computer-generated reality environment comprising a representation of a first real object and a displayed virtual object; means, in accordance with detecting, using one or more sensors, a movement of the first real object, for presenting a corresponding movement of the representation of the first real object from a first location to a second location in the computer-generated reality environment; and means, in accordance with a determination that a distance criteria is satisfied and the virtual object does not correspond to a second real object detected using the one or more sensors, for removing a portion of the displayed virtual object, wherein the distance criteria comprises a threshold distance between the second location and the virtual object.

DESCRIPTION OF THE FIGURES

FIGS. 4A-4B are a flow diagram illustrating a method for providing visual feedback indicating tangibility within a CGR environment, in accordance with some embodiments.

Figure 1A:
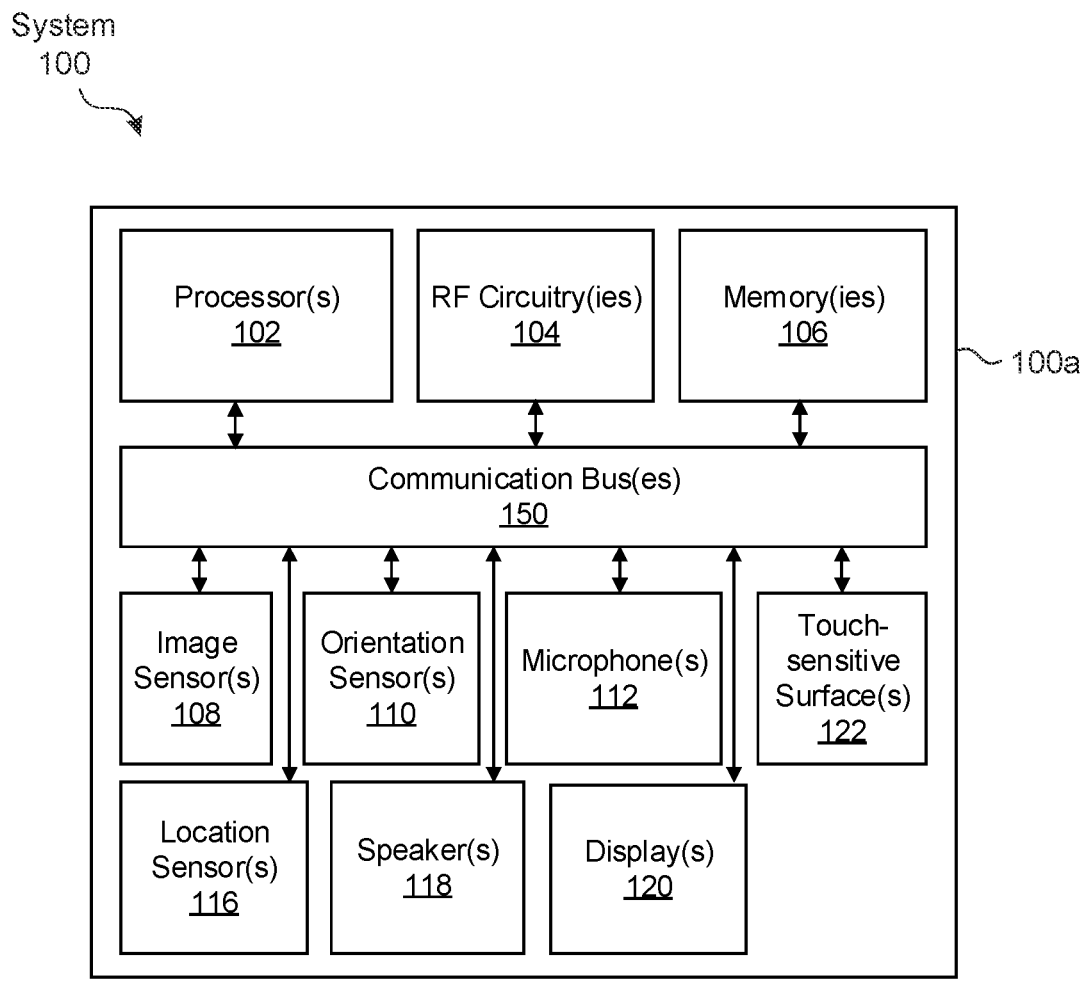
FIGS. 1A-1B depict exemplary systems for use in various CGR technologies, including virtual reality and mixed reality.

The embodiments depicted in the figures are only exemplary. One skilled in the art will readily recognize from the following discussion that alternative embodiments of the structures and methods illustrated herein can be employed without departing from the principles described herein.

DETAILED DESCRIPTION

Various examples of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
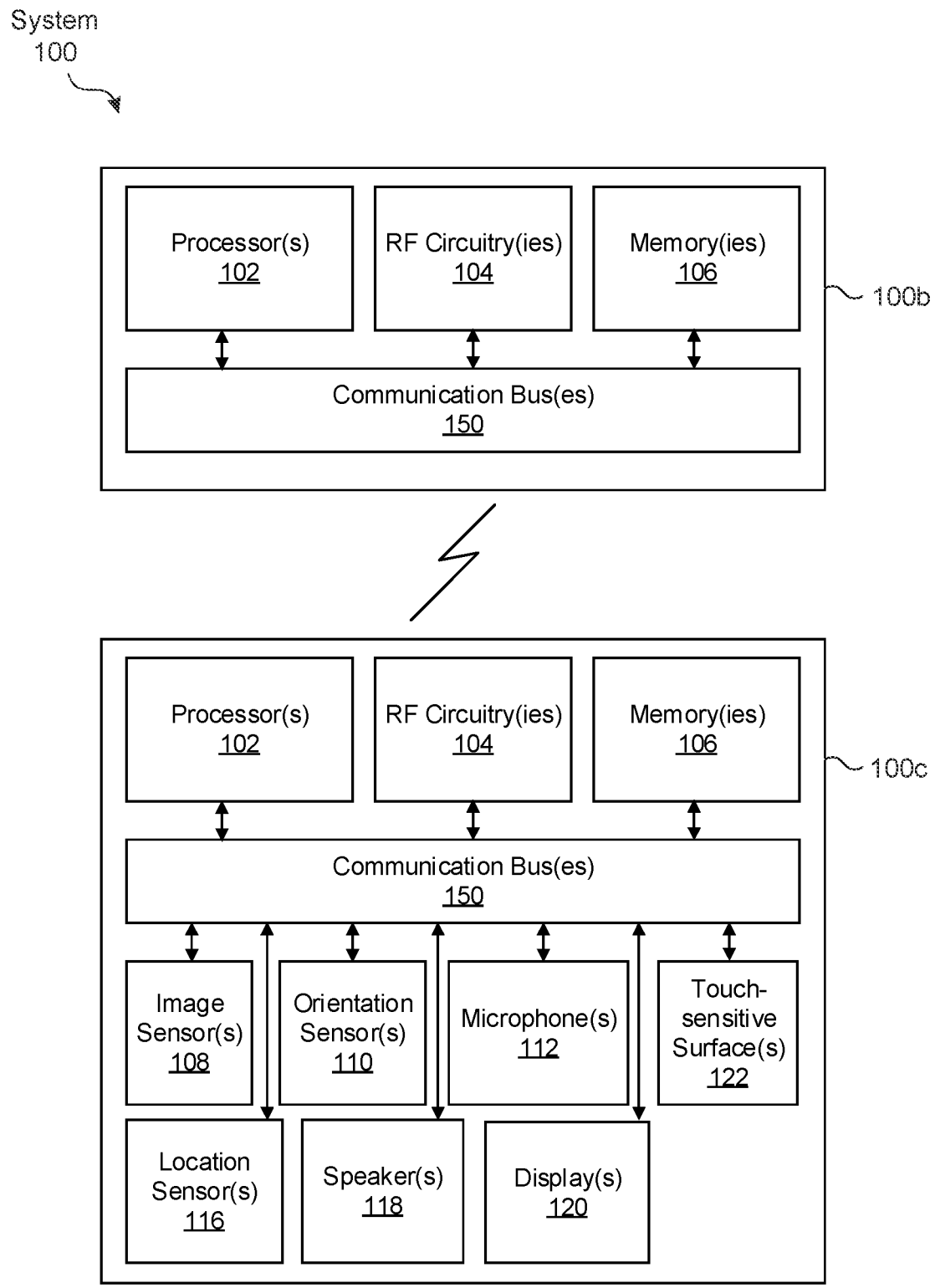

FIG. 1A and FIG. 1B depict exemplary system 100 for use in various computer-generated reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/ or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

FIGS. 2A-2D illustrate an exemplary technique for providing visual feedback indicating tangibility in a CGR environment that includes only virtual objects according to an embodiment of the present disclosure.

Figure 2A:
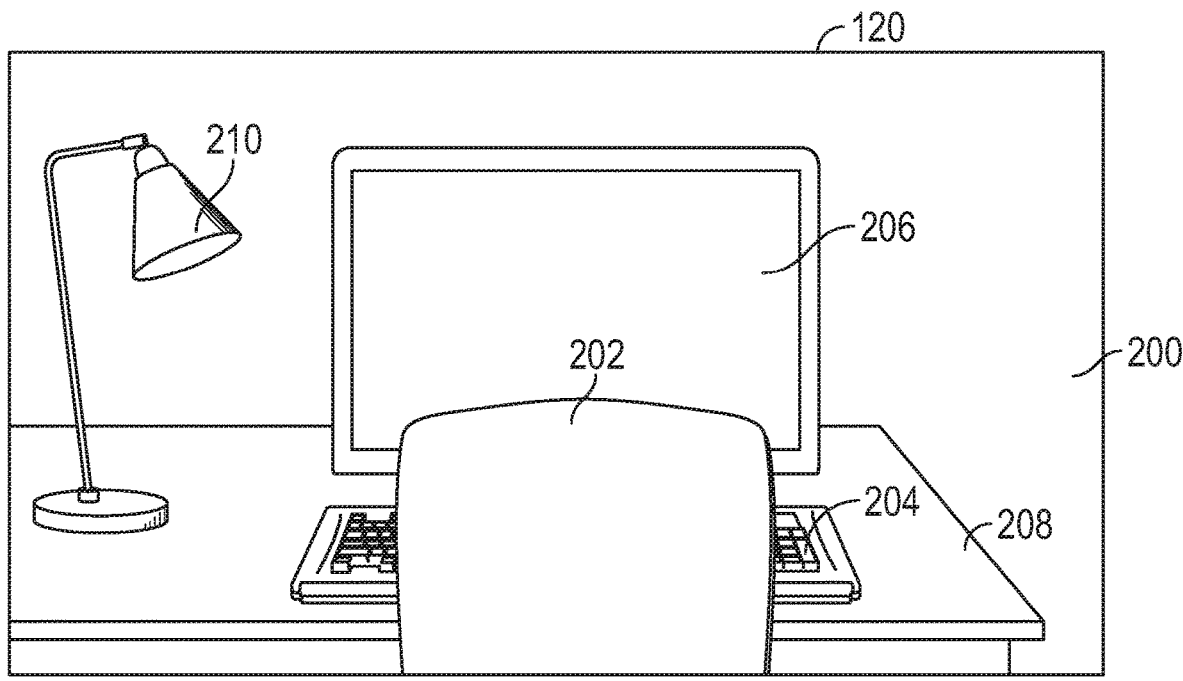
FIGS. 2A-2D illustrate an exemplary technique for providing visual feedback indicating tangibility in a CGR environment.

In FIG. 2A, a CGR environment 200 (e.g., based on virtual reality) includes a plurality of virtual objects 202-210 (e.g., virtual object 202 of a chair, virtual object 204 of a keyboard, virtual object 206 of a monitor, virtual object 208 of a desk, virtual object 210 of a lamp).

Figure 2B:
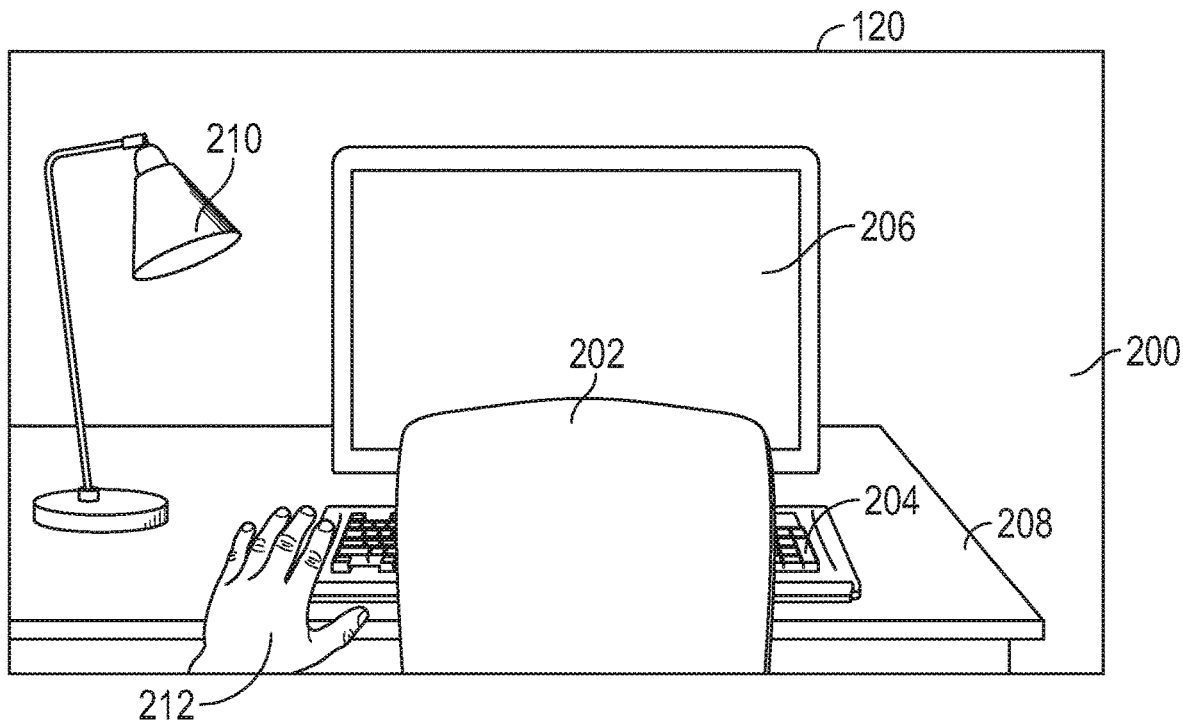

In FIG. 2B, device 100a presents (e.g., displays, causes display of, or allows viewing of), on display 120, a representation 212 (e.g., a computer-simulated reality representation or a direct, see-through view) in CGR environment 200 corresponding to a user-controlled real object in the real environment (e.g., a body portion of the user of device 100a, such as a hand, face, or head of the user; an object that is held or worn by the user in the real environment or otherwise controlled by the user in the real environment) that is controlled by the user of device 100a. Representation 212 simulates, within CGR environment 200, movements of the corresponding real object within the real environment. For example, if the user-controlled real object is the hand of the user, representation 212 simulates, within CGR environment 200, movements of the user's hand in the real environment. In some embodiments, the user-controlled real object (e.g., the user's hand) corresponding to representation 212 is detected via one or more sensors (e.g., image sensors) of device 100a, for instance, when the user-controlled real object is in the field of vision of the one or more sensors of device 100a. In some embodiments, the user-controlled real object (e.g., the user's hand) is additionally or alternatively detected via one or more sensors (e.g., image sensors, motion sensors, accelerometers, gyroscopes) external to device 100a (e.g., sensors installed in the real environment, such as a room, whereupon CGR environment 200 is based).

In some embodiments, display 120 of device 100a is a transparent display that enables a direct view of real objects in the real environment through the transparent display, and device 100a presents CGR environment 200 on the transparent display. In some embodiments, if display 120 is a transparent display, representation 212 corresponding to the user-controlled real object (e.g., the user's hand) is a direct view of the user-controlled real object (e.g., a direct view of the user's hand) in the real environment through the transparent display.

In some embodiments, if representation 212 corresponds to a hand of the user of the device, device 100a concurrently displays (or causes display of), on display 120, a second representation corresponding to the other hand of the user of the device (e.g., when both hands are detected within the field of vision of device 100a) in CGR environment 200. In some embodiments, device 100a displays (or causes display of), on display 120, a different representation corresponding to a different body portion of the user (e.g., the feet of the user) in CGR environment 200.

In some embodiments, if representation 212 corresponds to a hand of the user of the device, device 100a displays representation 212 within CGR environment 200 as a generic hand shape (e.g., a generic blue hand that is easily visible within the CGR environment). In some embodiments, representation 212 visually resembles the corresponding hand of the user in the real environment (e.g., similar size, similar skin tone, similar accessories, such as a ring).

In FIG. 2B, the user-controlled real object (e.g., the user's hand that is projected within CGR environment 200 as representation 212) is at least a threshold distance (e.g., 6 inches, 1 foot) away from any of virtual objects 202-210 within CGR environment 200. In some embodiments, device 100a detects (e.g., via one or more internal and/or external image sensors) the user-controlled real object (e.g., the user's hand) moving from its position in FIG. 2B to a position within CGR environment 200 that is less than a threshold distance away from a virtual object (e.g., virtual object 202) within CGR environment 200. In some embodiments, the threshold distance is predefined (e.g., by an operating system of device 100a or set by a user of device 100a).

Figure 2C:
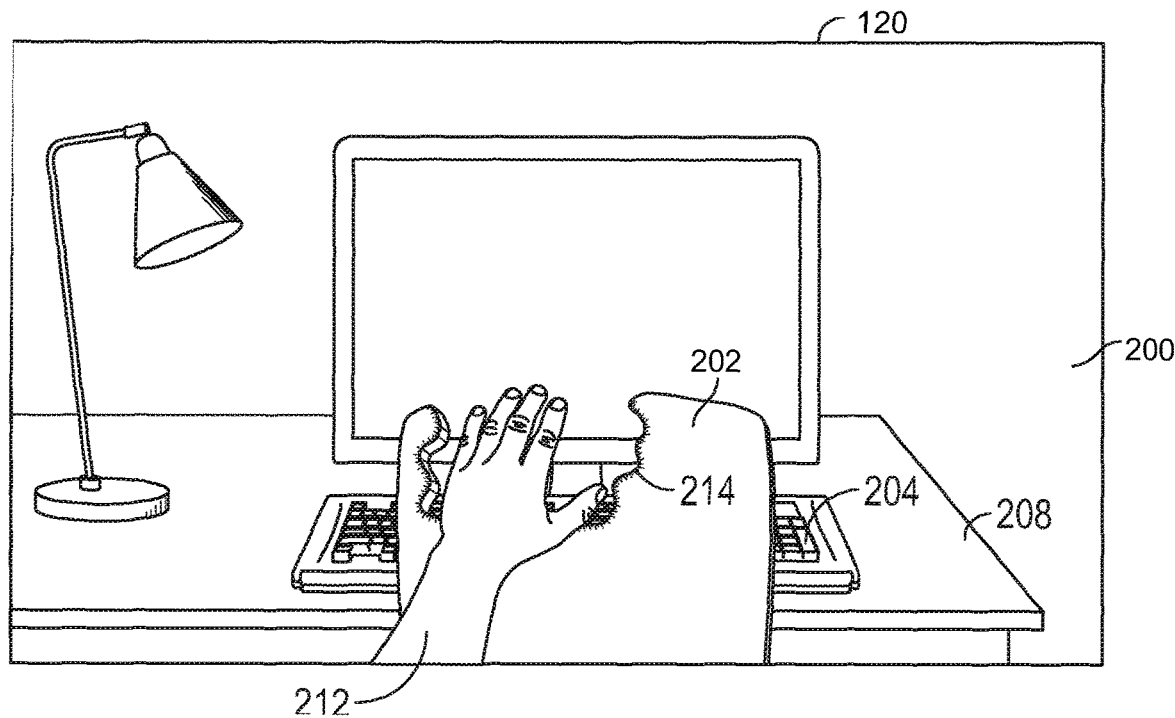

In FIG. 2C, upon detecting (e.g., via one or more internal and/or external image sensors) that the user-controlled real object (e.g., the user's hand that is projected within CGR environment 200 as representation 212) is within the threshold distanced (e.g., 6 inches, 1 foot) from virtual object 202 within CGR environment 200, device 100a displays (or causes display of), on display 120, a visual feedback 214 (e.g., a graphical effect, such as an aperture effect) that visually indicates to the user that virtual object 202 is a non-tangible virtual object and that the user-controlled real object (e.g., the user's hand) is within the threshold distance form the non-tangible virtual object.

In FIG. 2C, the user-controlled real object (e.g., user's hand) is within the threshold distance from virtual object 202 but at least the threshold distance away from other virtual objects 204-210 of CGR environment 200. In some embodiments, the threshold distance dynamically changes depending upon the speed of the user-controlled real object's (e.g., the user's hand's) movement in the real environment. For example, if device 100a detects (e.g., via one or more internal and/or external image sensors) that the speed of the movement of the user-controlled real object (e.g., the user's hand) is greater than a threshold speed, device 100a increases the threshold distance from virtual object 202 at which display of visual feedback 214 is triggered. For another example, if device 100 a detects (e.g., via one or more internal and/or external image sensors) that the speed of the movement of the user-controlled real object (e.g., the user's hand) is less than a threshold speed, device 100a decreases the threshold distance from virtual object 202 at which display of visual feedback 214 is triggered. In some embodiments, the threshold distance dynamically changes depending upon changes in the speed (e.g., acceleration or deceleration) of the user-controlled real object's (e.g., the user's hand) movement in the real environment. For example, if device 100a detects (e.g., via one or more internal and/or external image sensors) an acceleration in the speed of the movement of the user's hand, device 100a increases the threshold distance from virtual object 202 at which display of visual feedback 214 is triggered. For another example, if device 100a detects (e.g., via one or more internal and/or external image sensors) a deceleration in the speed of the movement of the user's hand, device 100a decreases the threshold distance from virtual object 202 at which display of visual feedback 214 is triggered.

In some embodiments, visual feedback 214 is provided via a graphical effect that is an aperture effect, where at least a portion of virtual object 202 (e.g., an area of the virtual object surrounding the user's hand and/or proximate to the user's hand within the virtual reality environment) corresponding to the visual feedback that is within a predetermined distance from representation 212 ceases to be displayed (e.g., faded out, grayed out, blurred out) such that the portion of virtual object 202 is no longer visible to the user on the display. In some embodiments, concurrently with the fading out effect, a region that was previously behind the faded-out portion of virtual object 202 in CGR environment 200 (e.g., because it was hidden from view by virtual object 202) becomes visible to the user on display 120. In some embodiments, the "fade-out effect is displayed on display 120 with a cloud-like pattern.

In some embodiments, visual feedback 214 is a dynamic aperture effect where the magnitude of the effect changes in accordance with the relative distance of the user-controlled real object (e.g., user's hand) to virtual object 202 within CGR environment 200. In some embodiments, visual feedback 214 (e.g., gradually) increases in magnitude as the distance between the user-controlled real object (e.g., the user's hand) and virtual object 202 decreases until the user-controlled real object reaches an area occupied by (e.g., corresponds to, overlaps with) virtual object 202 within CGR environment 200. In some embodiments, visual feedback 214 (e.g., gradually) decreases in magnitude as the distance between the user-controlled real object (e.g., the user's hand) and virtual object 202 increases until the user-controlled real object is more than the threshold distance (e.g., 6 inches, 1 foot) away from virtual object 202 (e.g., at which point visual feedback 214 is no longer displayed). In some embodiments, visual feedback 214 has a predetermined maximum size (e.g., at which point the dynamic aperture effect no longer increases in magnitude), where the predetermined maximum size is reached once the user-controlled real object (e.g., the user's hand that is projected within CGR environment 200 as SR representation 212) reaches a region of CGR environment 200 that is occupied by (e.g., corresponds to, overlaps with) virtual object 202 and/or passes through virtual object 202 within CGR environment 200.

In some embodiments, the rate of change of the magnitude of a visual feedback corresponds to (e.g., is proportional to) the rate of change of the speed of the movement of the user-controlled real object (e.g., the user's hand). In some embodiments, as the user-controlled real object (e.g., the user's hand) approaches virtual object 202 at an increasingly faster speed, corresponding visual feedback 214 increases in magnitude at an (e.g., proportionally) increasing rate. In some embodiments, as the user-controlled real object (e.g., the user's hand) approaches virtual object 202 at an increasingly slower speed, corresponding visual feedback 214 increases in magnitude at a (e.g., proportionally) decreasing rate. In some embodiments, as the distance between the user-controlled real object (e.g., the user's hand) and virtual object 202 increases at an increasingly faster speed, corresponding visual feedback 214 decreases in magnitude at an (e.g., proportionally) increasing rate. In some embodiments, as the distance between the user-controlled real object (e.g., the user's hand) and virtual object 202 increases at an increasingly slower speed, corresponding visual feedback 214 decreases in magnitude at a (e.g., proportionally) decreasing rate.

Figure 2D:
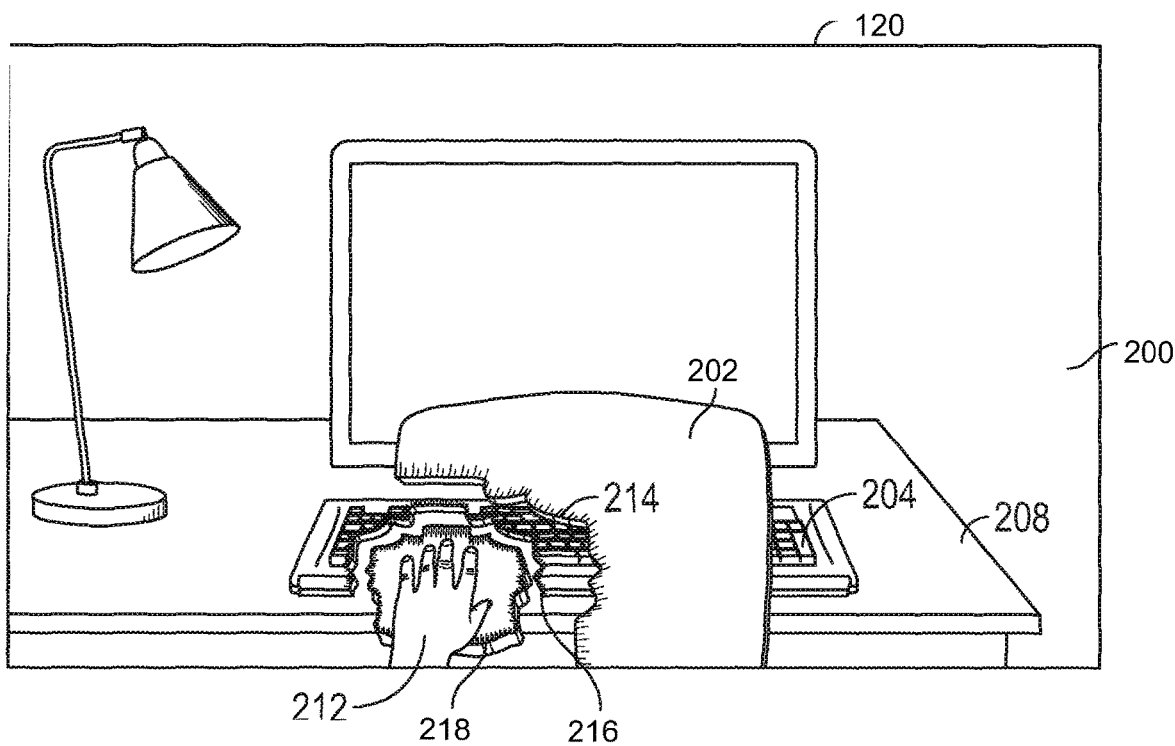

In FIG. 2D, the user-controlled real object (e.g., the user's hand that is projected within CGR environment 200 as representation 212) is passed through virtual object 202 within CGR environment 200 and is within the threshold distance (e.g., 6 inches, 1 foot) from virtual object 204 (e.g., a virtual keyboard) and virtual object 208 (e.g., a virtual desk). In some embodiments, upon detecting (e.g., via one or more internal and/or external image sensors) that the user-controlled real object (e.g., the user's hand) has "passed through" virtual object 202, device 100a maintains visual feedback 214 corresponding to virtual object 202 at a constant magnitude.

In some embodiments, further upon detecting (e.g., via one or more internal and/or external image sensors) that the user-controlled real object (e.g., the user's hand) is within the threshold distance (e.g., 6 inches, 1 foot) from virtual object 204 (e.g., a virtual keyboard), device 100a displays (or causes display of), on display 120, a visual feedback 216 similar to visual feedback 214, where visual feedback 216 is an aperture effect on virtual object 204. In some embodiments, further upon detecting (e.g., via one or more internal and/or external image sensors) that the user-controlled real object (e.g., the user's hand) is within the threshold distance (e.g., 6 inches, 1 foot) from virtual object 208 (e.g., a virtual desk), device 100a displays (or causes display of), on display 120, a visual feedback 218 similar to visual feedbacks 214 and 216, where visual feedback 218 is an aperture effect on virtual object 208.

In FIG. 2D, visual feedback 214 corresponding to virtual object 202 (e.g., a virtual chair) is larger in magnitude than both visual feedback 216 corresponding to virtual object 204 (e.g., a virtual keyboard) and virtual object 208 (e.g., a virtual desk) because the user-controlled real object (e.g., the user's hand that is projected within CGR environment 200 as representation 212) is passed through virtual object 202 but has not yet reached (e.g., though is within the threshold distance of) virtual objects 204 and 208. Further, visual feedback 216 corresponding to virtual object 204 is larger in magnitude than visual feedback 218 corresponding to virtual object 204 because the user-controlled real object (e.g., the user's hand) is closer to virtual object 204 than to virtual object 208 within CGR environment 200.

FIGS. 3A-3D illustrate an exemplary technique for providing visual feedback indicating tangibility in a CGR environment (e.g., based on mixed reality) that includes both virtual and real objects. In some embodiments, the CGR environment is projected onto a real environment (e.g., an enclosed area, such as a room) using one or more sensors (e.g., image sensors) that capture the contours of the real environment, and the projected CGR environment is displayed to the user via display 120 of device 100a.

Figure 3A:
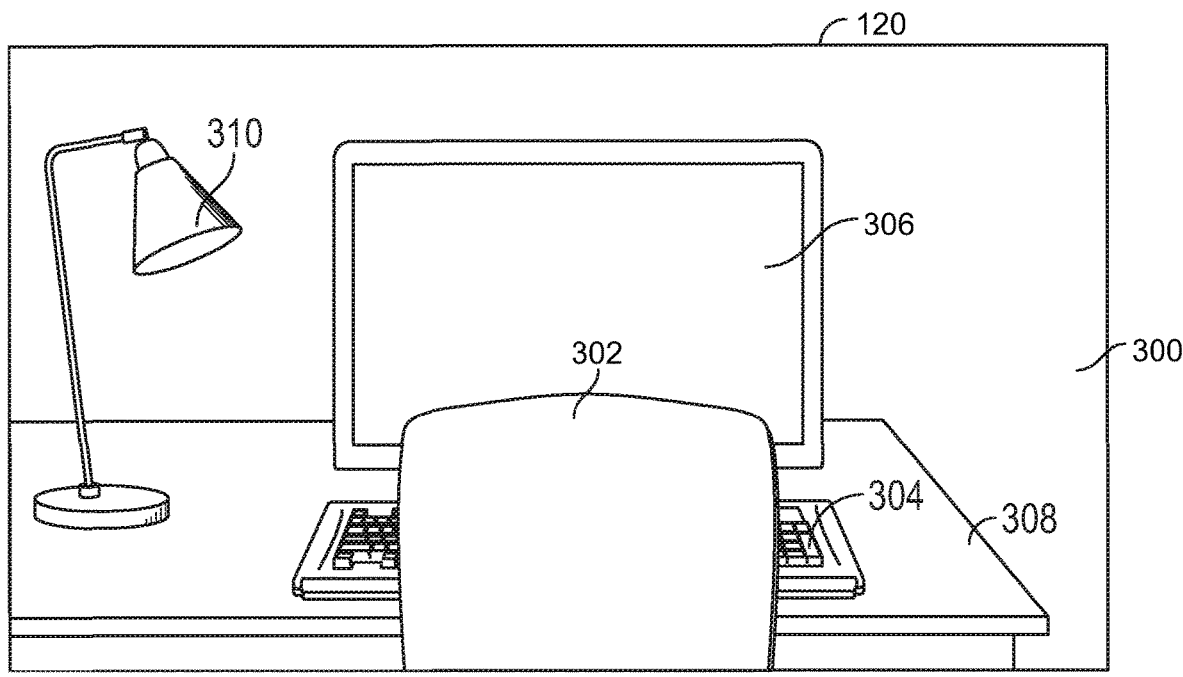
FIGS. 3A-3D illustrate an exemplary technique for providing visual feedback indicating tangibility in a CGR environment.

As shown in FIG. 3A, a CGR environment 300 (e.g., based on mixed reality) includes a plurality of virtual objects 302-306 (e.g., a virtual object 302 of a chair, a virtual object 304 of a keyboard, a virtual object 306 of a monitor) and a plurality of real or virtual representations 308-310 of real objects in the real environment (e.g., a virtual representation 308 of a real desk in the real environment, a virtual representation 310 of a real lamp in the real environment). Unlike the plurality of real or virtual representations 308-310, the plurality of virtual objects 302-306 are virtual (and thus non-tangible) and do not correspond to any real objects outside of CGR environment 300.

Figure 3B:
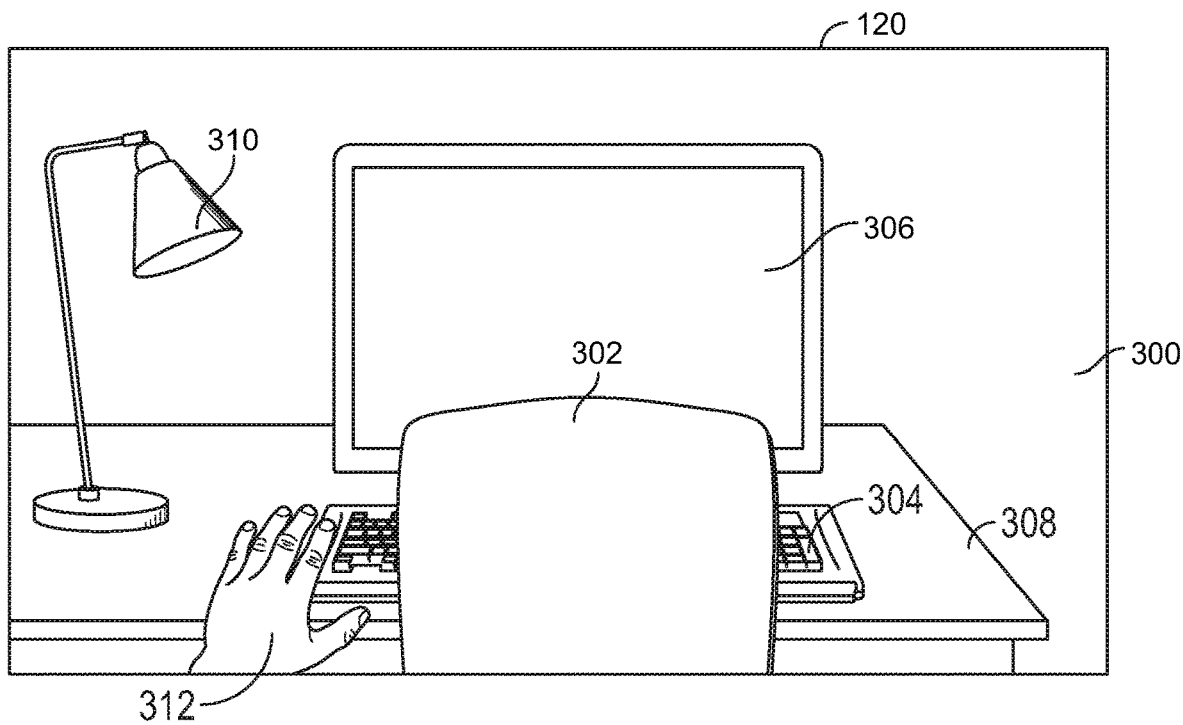

In FIG. 3B, device 100a displays (or causes display of), on display 120, a representation 312 (e.g., a computer-simulated reality representation or a direct, see-through view) in CGR environment 300 corresponding to a user-controlled real object in the real environment (e.g., a body portion of the user of device 100a, such as a hand, face, or head of the user; an object that is held or worn by the user in the real environment or otherwise controlled by the user in the real environment) that is controlled by the user of device 100a (e.g., same as or similar to representation 212 described above with reference to FIGS. 2A-2D). In some embodiments, the user-controlled real object (e.g., the user's hand) corresponding to representation 312 is detected via one or more sensors (e.g., image sensors) of device 100a, for instance, when the user-controlled real object is in the field of vision of the one or more sensors of device 100a. In some embodiments, the user-controlled real object (e.g., the user's hand) is additionally or alternatively detected via one or more sensors (e.g., image sensors, motion sensors, accelerometers, gyroscopes) external to device 100a (e.g., sensors installed in the real environment, such as a room, whereupon CGR environment 300 is based).

In some embodiments, display 120 of device 100a is a transparent display that enables a direct view of real objects in the real environment through the transparent display, and device 100a presents CGR environment 300 on the transparent display. In some embodiments, if display 120 is a transparent display, representation 312 corresponding to the user-controlled real object (e.g., the user's hand) is a direct view of the real object in the real environment through the transparent display.

In some embodiments, if representation 312 corresponds to a hand of the user of the device, device 100a concurrently displays (or causes display of), on display 120, a second representation corresponding to the other hand of the user of the device (e.g., when both hands are detected within the field of vision of device 100a) in CGR environment 300. In some embodiments, device 100a displays (or causes display of), on display 120, a different representation corresponding to a different body portion of the user (e.g., the feet of the user) in CGR environment 300.

In some embodiments, if representation 312 corresponds to a hand of the user of the device, device 100a displays representation 3212 within CGR environment 300 as a generic hand shape (e.g., a generic blue hand that is easily visible within the CGR environment). In some embodiments, representation 312 visually resembles the corresponding hand of the user in the real environment (e.g., similar size, similar skin tone, similar accessories, such as a ring).

In FIG. 3B, representation 312 is at least (or more than) a threshold distance (e.g., 6 inches, 1 foot) away from any of virtual objects 302-306 and virtual representations 308-310 of mixed reality environment 300. In some embodiments, while representation 312 is at least (or more than) the threshold distance away from any of virtual objects 302-306 and virtual representations 308-310, device 100a detects (e.g., via one or more internal and/or external image sensors) that the user-controlled real object (e.g., the user's hand) is moving from its position in FIG. 3B to a position that is less than the threshold distance away from one or more virtual objects and/or virtual representations within CGR environment 300.

Figure 3C:
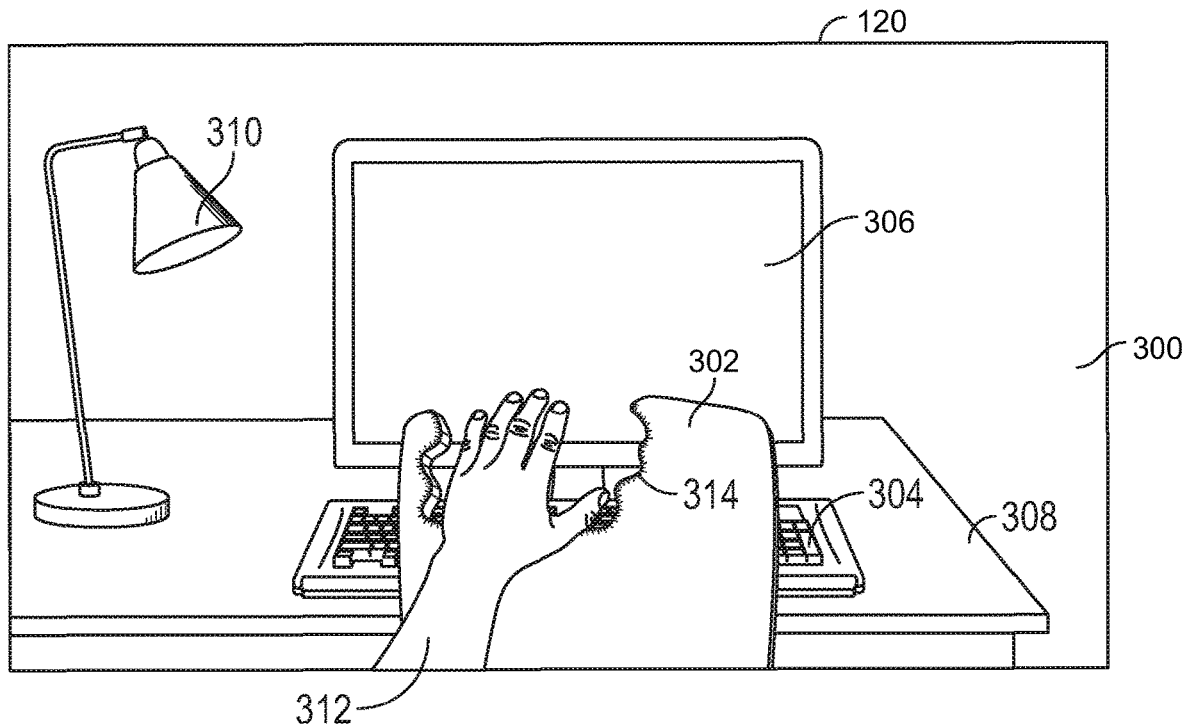

In FIG. 3C, upon detecting (e.g., via one or more internal and/or external image sensors) that the user-controlled real object (e.g., user's hand) is within the threshold distance (e.g., 1 foot) from virtual object 302 (e.g., a virtual chair) within CGR environment 300, device 100a displays (or causes display of), on display 120, a visual feedback 314 (e.g., a graphical effect, such as an aperture effect, similar to visual feedback 214 described with reference to FIGS. 2A-2D). In FIG. 3C, the user-controlled real object (e.g., the user's hand) is within the threshold distance from virtual object 302 but not within the threshold distance from virtual objects 304-306 and virtual representations 308-310 of mixed reality environment 300.

Figure 3D:
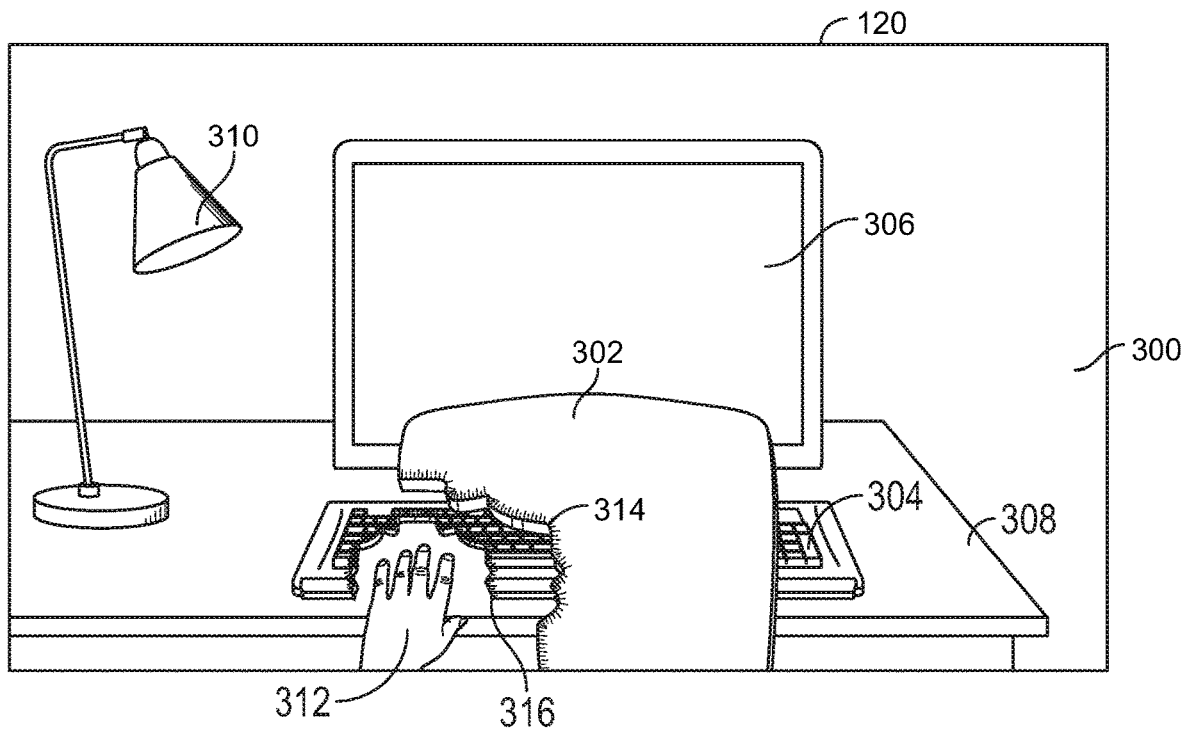

In FIG. 3D, the user-controlled real object (e.g., the user's hand) is passed through virtual object 302 and is within the threshold distance (e.g., 6 inches, 1 foot) from virtual object 304 (e.g., a virtual keyboard) and virtual representation 308 (e.g., corresponding to a real desk in the real environment). In some embodiments, upon detecting (e.g., via one or more internal and/or external image sensors) that the user-controlled real object (e.g., the user's hand) is passed through virtual object 302, device 100a maintains visual feedback 314 corresponding to virtual object 302 at a constant magnitude.

In some embodiments, upon detecting (e.g., via one or more internal and/or external image sensors) that the user-controlled real object (e.g., the user's hand) is within the threshold distance from virtual object 304 (e.g., a virtual keyboard), device 100*a* displays (or causes display of), on display 120, a visual feedback 316 on virtual object 304 similar to visual feedback 314 on virtual object 302 (e.g., an aperture effect over at least a portion of virtual object 304 such that a portion of the CGR environment behind virtual object 304 that was hidden from view is now visible through the aperture effect).

In some embodiments, upon detecting (e.g., via one or more internal and/or external image sensors) that the user-controlled real object (e.g., the user's hand) is within the threshold distance (e.g., 6 inches, 1 foot) from virtual representation 308 (e.g., a virtual representation corresponding to a real desk in the real environment), device 100*a* does not display (or cause display of) a visual feedback because virtual representation 308 corresponds to a real object in the real environment (unlike virtual objects 302 and 304, which are virtual objects (and thus non-tangible) that do not correspond to any real objects in the real environment). Thus, in FIG. 3D, even though the user-controlled real object (e.g., the user's hand) is passed through virtual object 302 and within the threshold distance (e.g., 6 inches, 1 foot) from virtual object 304 and virtual representation 308, a visual feedback is only generated and displayed by device 100*a* for virtual objects 302 and 304, and not for virtual representation 308.

By providing visual feedback (e.g., visual feedback 314 and 316) for virtual objects but not for virtual representations 308-310 of real objects, device 100*a* enables the user to quickly and easily recognize whether particular objects within mixed reality environment 300 are non-tangible virtual objects or are virtual representations of real and tangible objects, and to quickly and easily distinguish between the non-tangible virtual objects and virtual representations of real and tangible objects within the surrounding environment (e.g., thereby enhancing user safety by minimizing confusion on the part of the user as to which items are virtual, and thus not tangible, and which items are real, and thus tangible).

In some embodiments, the visual feedback (e.g., visual feedback 214 on virtual object 202, visual feedback 314 on virtual object 302) described above with reference to FIGS. 2A-2D and FIGS. 3A-3D are generated for virtual objects of a CGR environment based on augmented reality. In some embodiments, the CGR environment based on augmented reality is displayed to a user on a display of device 100*a*, where the display is (at least partially) a transparent display that enables the user to directly view the surrounding real environment through the display and virtual objects displayed over the real environment to augment the real environment. In some embodiments, the visual feedback described above with reference to FIGS. 2A-2D and FIGS. 3A-3D are provided for virtual objects within the CGR environment based on augmented reality, thereby quickly and more clearly indicating to the user that the virtual objects are in fact virtual.

Figure 4A:
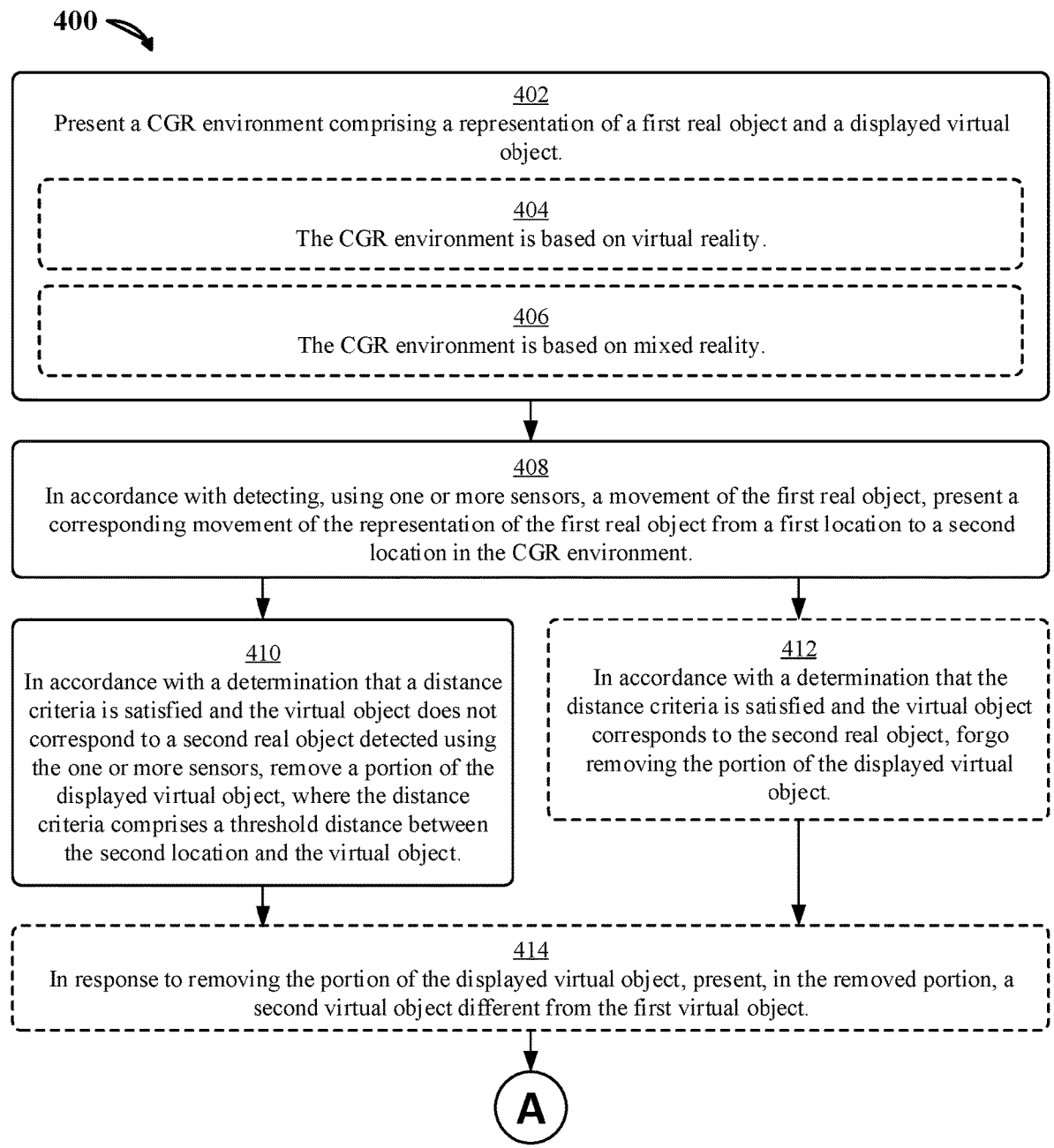

FIGS. 4A-4B are a flow diagram illustrating an exemplary process performed by an electronic device (e.g., device 100*a*). In some embodiments, the device has a display. In some embodiments, the display is a (at least partially) transparent display. In some embodiments, the electronic device is connected to and in communication with a display that is separate from the device. In some embodiments, the electronic device has one or more sensor devices (e.g., image sensor(s) 108, orientation sensor(s) 110, location sensor(s) 116). In some embodiments, the electronic device is connected to and in communication with one or more sensor devices (e.g., image sensor(s) 108, orientation sensor(s) 110, location sensor(s) 116) that are separate from the device. In some embodiments, the electronic device is a head-mounted device. In some embodiments, the electronic device is separate from but is secured on (or configured to be secured to) a head-mounted device. In some embodiments, the electronic device includes one or more speakers (e.g., speaker(s) 118) for outputting audio. In some embodiments, the electronic device is connected (or configured to be connected) to (e.g., via wireless connection, via wired connection) and in communication (or configured to be in communication) with one or more speakers (e.g., speaker(s) 118) for outputting audio.

At block 402, the electronic device (e.g., 100*a*) presents (e.g., allows viewing of, displays, or causes display of, on display 120) a CGR environment (e.g., 200, 300) comprising a (e.g., real or virtual) representation of a first real object (e.g., a user or body part of a user, such as the hand of the user; 212, 312) and a displayed virtual object (e.g., 202, 204, 206, 208, 210, 302, 304, 306, 308, 310). In some embodiments, at block 404, the CGR environment is based on virtual reality (e.g., CGR environment 200). In some embodiments, at block 406, the CGR environment is based on mixed reality (e.g., CGR environment 300), including augmented reality.

In some embodiments, the representation of the first real object (e.g., 212, 312) corresponds to a presented image of the first real object in the CGR environment. In some embodiments, the representation of the first real object (e.g., 212, 312) corresponds to a direct view of the first real object through a display presenting the CGR environment.

At block 408, in accordance with detecting, using one or more sensors, a movement of a first real object (e.g., a body part of the user), the electronic device (e.g., 100*a*) presents (e.g., allows viewing of, displays, or causes display of, on display 120) a corresponding movement of the (e.g., real or virtual) representation of the first real object (e.g., 212, 312) from a first location to a second location in the CGR environment. In some embodiments, the first real object is a body part of the user (e.g., a hand of the user, a face or head of the user, a foot of the user).

At block 410, in accordance with a determination that a distance criteria is satisfied and the virtual object (e.g., 202, 204, 206, 208, 210, 302, 304, 306, 310) does not correspond to a second real object detected using the one or more sensors, the electronic device (e.g., 100*a*) removes a portion (e.g., 214, 216, 218, 314, 316) of the displayed virtual object, where the distance criteria comprises a threshold distance between the second location and the virtual object. In some embodiments, the electronic device (e.g., 100*a*) determines whether the virtual object corresponds to the second real object based on reconstruction data extracted from an image of the real environment captured using the one or more sensors. In some embodiments, the virtual object does not correspond to the second real object when the virtual object is not a representation of the second real object in the CGR environment.

In some embodiments, the portion (e.g., 214, 216, 218, 314, 316) of the displayed virtual object (e.g., 202, 204, 208, 210, 302, 304, 306, 310) is removed via an aperture effect.

In some embodiments, at block 412, in accordance with a determination that the distance criteria is satisfied and the virtual object (e.g., 308) corresponds to the second real object, the electronic device (e.g., 100*a*) forgoes removing the portion of the displayed virtual object (e.g., 202, 204, 208, 210, 302, 304, 306, 310). In some embodiments (e.g., prior to presenting a CGR environment comprising a virtual object and a virtual representation of a user), the electronic device (e.g., 100*a*) obtains an image of a third real object using the one or more sensors and presents, in the CGR environment (e.g., 300), a representation of the third real object (e.g., 308). In some examples, the electronic device (e.g., 100*a*) forgoes removing the portion of the displayed virtual object in accordance with a determination that the distance criteria is satisfied and the virtual object (e.g., 308) corresponds to the second real object detected using the one or more sensors. In some embodiments, the one or more sensors that are used are the same as the one or more sensors that are used to detect the movement of the first real object at block 410. In some embodiments, the one or more sensors that are used are different from the one or more sensors that are used to detect the movement of the first real object at block 410.

In some embodiments, at block 414, in response to removing the portion of the displayed virtual object, the electronic device (e.g., 100*a*) presents, in the removed portion, a second virtual object different from the virtual object (e.g., 202, 204, 208, 210, 302, 304, 306, 310).

In some embodiments, in accordance with a determination that a speed of the representation of the first real object (e.g., 212, 312) from the first location to the second location in the CGR environment corresponds to a first speed that is greater than a baseline speed, the threshold distance is greater than a baseline threshold distance. In some embodiments, in accordance with a determination that the speed of the representation of the first real object (e.g., 212, 312) from the first location to the second location in the CGR environment corresponds to a second speed that is less than the baseline speed, the threshold distance is less than the baseline threshold distance.

In some embodiments, in accordance with a determination that a speed of the representation of the first real object (e.g., 212, 312) is increasing from the first location to the second location in the CGR environment, the threshold distance is greater than a baseline threshold distance. In some embodiments, in accordance with a determination that the speed of the representation of the first real object (e.g., 212, 312) is decreasing from the first location to the second location in the CGR environment, the threshold distance is less than the baseline threshold distance.

In some embodiments, the threshold distance between the second location and the virtual object comprises the distance between the representation of the first real object (e.g., 212, 312) in the CGR environment and the displayed virtual object in the CGR environment.

In some embodiments, a magnitude of the portion of the displayed virtual object (e.g., the area of the displayed virtual object) that is removed is determined based on a distance between the second location in the CGR environment and the displayed virtual object in the CGR environment.

In some embodiments, at block 416, in accordance with detecting, using the one or more sensors, a second movement of the first real object (e.g., the hand of the user) from the second location to a third location in the CGR environment, the electronic device (e.g., 100*a*) presents, at block 418, a corresponding movement of the representation of the first real object (e.g., 212, 312) from the second location to the third location in the CGR environment (e.g., 200, 300). In some embodiments, at block 416, in accordance with detecting, using the one or more sensors, a second movement of the first real object (e.g., the hand of the user) from the second location to a third location in the CGR environment, in accordance with a determination that a second distance criteria is satisfied and the virtual object (e.g., 202, 204, 206, 208, 210, 302, 304, 306, 310) does not correspond to the second real object, the electronic device (e.g., 100*a*) removes, at block 420, a second portion of the displayed virtual object, where the second portion is different from the portion of the displayed virtual object that was removed. In some examples, the amount of the second portion removed is based on a distance between the representation of the first real object at the third location and the virtual object. In some examples, the second distance criteria comprises a determination that the representation of the first real object at the third location is within a second threshold distance of the virtual object. In some examples, the value of the second threshold distance is based on a speed or acceleration of the second movement.

In some embodiments, at block 416, in accordance with detecting, using the one or more sensors, a second movement of the first real object (e.g., the hand of the user) from the second location to a third location in the CGR environment, in accordance with a determination that a second distance criteria is satisfied and the virtual object (e.g., 202, 204, 206, 208, 210, 302, 304, 306, 310) does not correspond to the second real object, the electronic device (e.g., 100*a*) removes, at block 422, an additional portion of the displayed virtual object from the displayed virtual object with the portion removed, where the second distance criteria is met when the third location is within a second threshold distance of the virtual object, the second threshold distance being less than the threshold distance. In some embodiments, the electronic device (e.g., 100*a*) continues to remove additional portions of the displayed virtual object in response to detecting that the representation of the real object (e.g., 212, 312) is moving increasingly closer to the virtual object in the CGR environment.

In some embodiments, at block 416, in accordance with detecting, using the one or more sensors, a second movement of the first real object (e.g., the hand of the user) from the second location to a third location in the CGR environment, in accordance with a determination that the distance criteria is no longer satisfied, the electronic device (e.g., 100*a*) re-presents (e.g., re-displays, on display 120), at block 424, the removed portion of the displayed virtual object (e.g., 202, 204, 206, 208, 210, 302, 304, 306, 310).

The foregoing descriptions of specific embodiments and processes, as described with reference to FIGS. 2A-2D, 3A-3D, and FIGS. 4A-4B respectively, have been presented for purposes of illustration and description. They are not intended to be exhaustive or to limit the scope of the claims to the precise forms disclosed, and it should be understood that many modifications and variations are possible in light of the above descriptions.

What is claimed is:

1. An electronic device, comprising:
   one or more processors; and
   memory storing one or more programs configured to be executed by the one or more processors, the one or more programs including instructions for:
   presenting a three-dimensional environment comprising a first real object and a displayed virtual object, wherein the displayed virtual object does not correspond to a second real object;
   presenting movement of the first real object from a first location to a second location in the three-dimensional environment; and in accordance with a determination that a distance criteria is satisfied, removing a portion of the displayed virtual object, wherein the distance criteria comprises a threshold distance between the second location and the displayed virtual object.

2. The electronic device of claim 1, the one or more programs further including instructions for:
in accordance with a determination that the distance criteria is not satisfied, forgoing removing the portion of the displayed virtual object.

3. The electronic device of claim 1, the one or more programs further including instructions for:
in response to removing the portion of the displayed virtual object, presenting, in the removed portion, a second virtual object different from the displayed virtual object.

4. The electronic device of claim 1, wherein the portion of the displayed virtual object is removed via an aperture effect.

5. The electronic device of claim 1, wherein the first real object corresponds to a presented image of the first real object in the three-dimensional environment.

6. The electronic device of claim 1, wherein the first real object corresponds to a direct view of the first real object through a display presenting the three-dimensional environment.

7. The electronic device of claim 1, wherein the first real object is a hand of a user.

8. The electronic device of claim 1, the one or more programs further including instructions for:
obtaining an image of a third real object; and
presenting, in the three-dimensional environment, the third real object.

9. The electronic device of claim 1, wherein:
in accordance with a determination that a speed of the first real object from the first location to the second location in the three-dimensional environment corresponds to a first speed that is greater than a baseline speed, the threshold distance is greater than a baseline threshold distance; and
in accordance with a determination that the speed of the first real object from the first location to the second location in the three-dimensional environment corresponds to a second speed that is less than the baseline speed, the threshold distance is less than the baseline threshold distance.

10. The electronic device of claim 1, wherein:
in accordance with a determination that a speed of the first real object is increasing from the first location to the second location in the three-dimensional environment, the threshold distance is greater than a baseline threshold distance; and
in accordance with a determination that the speed of the first real object is decreasing from the first location to the second location in the three-dimensional environment, the threshold distance is less than the baseline threshold distance.

11. The electronic device of claim 1, wherein the threshold distance between the second location and the displayed virtual object comprises a distance between the first real object in the three-dimensional environment and the displayed virtual object in the three-dimensional environment.

12. The electronic device of claim 1, wherein a magnitude of the portion of the displayed virtual object that is removed is determined based on a distance between the second location in the three-dimensional environment and the displayed virtual object in the three-dimensional environment.

13. The electronic device of claim 1, the one or more programs further including instructions for:
in accordance with detecting a second movement of the first real object from the second location to a third location in the three-dimensional environment:
presenting a corresponding movement of the first real object from the second location to the third location in the three-dimensional environment; and
in accordance with a determination that the distance criteria is satisfied, removing a second portion of the displayed virtual object, the second portion different from the portion of the displayed virtual object that is removed.

14. The electronic device of claim 13, the one or more programs further including instructions for:
further in accordance with detecting the second movement of the first real object:
in accordance with a determination that a second distance criteria is satisfied, removing an additional portion of the displayed virtual object from the displayed virtual object with the portion removed, wherein the second distance criteria is satisfied when the third location is within a second threshold distance of the displayed virtual object, the second threshold distance smaller than the threshold distance.

15. The electronic device of claim 13, the one or more programs further including instructions for:
further in accordance with detecting the second movement of the first real object:
in accordance with a determination that the distance criteria is no longer satisfied, representing the removed portion of the displayed virtual object.

16. A non-transitory computer-readable storage medium storing one or more programs configured to be executed by one or more processors of an electronic device, the one or more programs including instructions for:
presenting a three-dimensional environment comprising a first real object and a displayed virtual object, wherein the displayed virtual object does not correspond to a second real object;
presenting movement of the first real object from a first location to a second location in the three-dimensional environment; and
in accordance with a determination that a distance criteria is satisfied, removing a portion of the displayed virtual object, wherein the distance criteria comprises a threshold distance between the second location and the displayed virtual object.

17. The non-transitory computer-readable storage medium of claim 16, the one or more programs further including instructions for:
in accordance with a determination that the distance criteria is not satisfied, forgoing removing the portion of the displayed virtual object.

18. The non-transitory computer-readable storage medium of claim 16, the one or more programs further including instructions for:
in response to removing the portion of the displayed virtual object, presenting, in the removed portion, a second virtual object different from the displayed virtual object.

19. The non-transitory computer-readable storage medium of claim 16, wherein:
in accordance with a determination that a speed of the first real object from the first location to the second location in the three-dimensional environment corresponds to a first speed that is greater than a baseline speed, the threshold distance is greater than a baseline threshold distance; and in accordance with a determination that the speed of the first real object from the first location to the second location in the three-dimensional environment corresponds to a second speed that is less than the baseline speed, the threshold distance is less than the baseline threshold distance.

20. The non-transitory computer-readable storage medium of claim 16, wherein:

in accordance with a determination that a speed of the first real object is increasing from the first location to the second location in the three-dimensional environment, the threshold distance is greater than a baseline threshold distance; and in accordance with a determination that the speed of the first real object is decreasing from the first location to the second location in the three-dimensional environment, the threshold distance is less than the baseline threshold distance.

21. A method, comprising:

at an electronic device:

presenting a three-dimensional environment comprising a first real object and a displayed virtual object, wherein the displayed virtual object does not correspond to a second real object;

presenting movement of the first real object from a first location to a second location in the three-dimensional environment; and in accordance with a determination that a distance criteria is satisfied, removing a portion of the displayed virtual object, wherein the distance criteria comprises a threshold distance between the second location and the displayed virtual object.

22. The method of claim 21, further comprising:

in accordance with a determination that the distance criteria is not satisfied, forgoing removing the portion of the displayed virtual object.

23. The method of claim 21, further comprising:

in response to removing the portion of the displayed virtual object, presenting, in the removed portion, a second virtual object different from the displayed virtual object.

24. The method of claim 21, wherein:

in accordance with a determination that a speed of the first real object from the first location to the second location in the three-dimensional environment corresponds to a first speed that is greater than a baseline speed, the threshold distance is greater than a baseline threshold distance; and in accordance with a determination that the speed of the first real object from the first location to the second location in the three-dimensional environment corresponds to a second speed that is less than the baseline speed, the threshold distance is less than the baseline threshold distance.

25. The method of claim 21 wherein:

in accordance with a determination that a speed of the first real object is increasing from the first location to the second location in the three-dimensional environment, the threshold distance is greater than a baseline threshold distance; and in accordance with a determination that the speed of the first real object is decreasing from the first location to the second location in the three-dimensional environment, the threshold distance is less than the baseline threshold distance.

\* \* \* \* \*